(12) United States Patent
Kim et al.

(10) Patent No.: US 11,493,716 B2
(45) Date of Patent: Nov. 8, 2022

(54) OPTICAL FIBER COMPOSITE GROUND WIRE USING COMPOSITE MATERIAL

(71) Applicant: Metal Link Inc., Chungcheongbuk-do (KR)

(72) Inventors: Shangshu Kim, Daegu (KR); Youngho Lee, Gyeonggi-do (KR)

(73) Assignee: METAL LINK INC., Chungcheongbuk-Do (KR)

( * ) Notice: Subject to any disclaimer, the term of this patent is extended or adjusted under 35 U.S.C. 154(b) by 0 days.

(21) Appl. No.: 17/281,559

(22) PCT Filed: Feb. 19, 2020

(86) PCT No.: PCT/KR2020/002372
§ 371 (c)(1),
(2) Date: Mar. 30, 2021

(87) PCT Pub. No.: WO2020/222409
PCT Pub. Date: Nov. 5, 2020

(65) Prior Publication Data
US 2022/0050257 A1    Feb. 17, 2022

(30) Foreign Application Priority Data

Apr. 29, 2019   (KR) .......................... 10-2019-0049971

(51) Int. Cl.
*G02B 6/44* (2006.01)
(52) U.S. Cl.
CPC .......... *G02B 6/4432* (2013.01); *G02B 6/4488* (2013.01)
(58) Field of Classification Search
CPC ........................... G02B 6/4432; G02B 6/4488
USPC ............................................................ 385/101
See application file for complete search history.

(56) References Cited

U.S. PATENT DOCUMENTS

| | | | | |
|---|---|---|---|---|
| 5,636,307 A | * | 6/1997 | Cowen | G02B 6/4402 385/102 |
| 6,195,488 B1 | * | 2/2001 | Song | G02B 6/4416 385/101 |
| 2006/0072886 A1 | * | 4/2006 | Kim | G02B 6/4432 385/115 |
| 2007/0019914 A1 | * | 1/2007 | Ohtsu | G02B 6/1221 385/100 |

(Continued)

FOREIGN PATENT DOCUMENTS

| KR | 10-1998-0029907 | 7/1998 |
|---|---|---|
| KR | 10-1999-0051340 | 7/1999 |

(Continued)

OTHER PUBLICATIONS

International Search Report dated May 26, 2020 in corresponding International Patent Application No. PCT/KR2020/002372 (in English).

(Continued)

*Primary Examiner* — Jerry M Blevins
(74) *Attorney, Agent, or Firm* — Grossman, Tucker, Perreault & Pfleger, PLLC

(57) ABSTRACT

The present invention relates to an optical fiber composite ground wire using a composite material. More particularly, the present invention relates to an optical fiber composite ground wire using a composite material, which has simple structure, light weight, improved tensile strength, and reduced electrical resistance.

13 Claims, 4 Drawing Sheets

(56) References Cited

U.S. PATENT DOCUMENTS

| | | | |
|---|---|---|---|
| 2008/0193090 A1 | 8/2008 | Riddett et al. | |
| 2009/0297106 A1 | 12/2009 | Pizzomo et al. | |
| 2016/0377825 A1* | 12/2016 | Bringuier | G02B 6/443 385/113 |
| 2017/0293097 A1* | 10/2017 | Ito | G02B 6/449 |
| 2018/0314027 A1* | 11/2018 | Ishikawa | H01B 13/02 |

FOREIGN PATENT DOCUMENTS

| | | |
|---|---|---|
| KR | 10-2000-0046916 | 7/2000 |
| KR | 2003-0049587 | 6/2003 |
| WO | 2020222409 | 11/2020 |

OTHER PUBLICATIONS

Written Opinion dated May 26, 2020 in corresponding International Patent Application No. PCT/KR2020/002372 (in Korean).

* cited by examiner

OPTICAL FIBER COMPOSITE GROUND WIRE USING COMPOSITE MATERIAL

CROSS-REFERENCE TO RELATED APPLICATIONS

This application is a National Phase Application of PCT International Application No. PCT/KR2020/002372, which was filed on Feb. 19, 2020, and which claims priority from Korean Patent Application No. 10-2019-0049971, filed on Apr. 29, 2019. The disclosures of the above patent applications are incorporated herein by reference in their entirety.

BACKGROUND

1. Technical Field

The present invention relates to an optical fiber composite ground wire using a composite material. More particularly, the present invention relates to an optical fiber unit using a composite material and an optical fiber composite ground wire including the same, which has simple structure, light weight, improved tensile strength, and reduced electrical resistance.

2. Description of Related Art

Optical Fiber Composite Ground Wire (OPGW) combines the functions of ground wire to shield the high-voltage transmission line and communications using optical fibers by being installed along with the transmission line in the steel tower.

In order to satisfy both mechanical and electrical properties of the ground wire, aluminum wires and aluminum-clad steel wires are twisted on the optical fiber unit in the optical fiber composite ground wire. The optical fiber composite ground wire must be capable of maintaining its stable performance even in extreme changes in the external environment such as typhoons, lightning strikes, and power line accidents.

Conventional optical fiber composite ground wire comes in two types, tight buffer type and loose tube type.

The optical fiber composite ground wire in the tight buffer type is composed of a coated optical fiber, a loose tube in which jelly, single-core or multi-core optical fibers are placed to prevent moisture penetration into the tube, a protective layer to protect the optical fiber from external impact and compression, a filler filling between the protective layer and the loose tube, an aluminum-clad steel wire to reinforce the insufficient tensile load of the optical fiber composite ground wire, and an aluminum wire for electrical properties.

The optical fiber composite ground wire in the loose tube-type is composed of an optical fiber, a loose tube wrapping the optical fiber and being filled with jelly, a barrier layer surrounding a number of the loose tubes into which the optical fibers are inserted, an aluminum tube surrounding the barrier layer, and an aluminum-clad steel wire and an aluminum wire surrounding the aluminum tube. Conventionally, increasing the thickness of the loose tube or using a high-strength material has tried in order to prevent communication quality deterioration due to optical fiber damage. The aluminum-clad steel wire and aluminum used for the tension wire are made into segments to maximize the bridge effect.

The conventional optical fiber composite ground wire has disadvantages of difficulties in manufacture due to complicated configuration and high manufacturing costs. In addition, the burden of material cost is high since it is bulky and heavy and there is fear of disconnection due to more than necessary tensile strength applied to the optical fiber as the line is struck down by its own load in actual application. In such an optical fiber composite ground wire, the steel tower safety decreases due to increase in the outer diameter and weight of the cable and it may cause damage to the tube and the optical fiber due to compression impact during installation.

Korean Patent Publication No. 10-2003-0049587 discloses an optical fiber ground wire.

SUMMARY

An object of this disclosure is to provide an optical fiber composite ground wire that has a simple structure and does not require a peripheral tension wire by using a high-strength composite material capable of relieving impact applied to an optical fiber.

Another object of this disclosure is to provide an optical fiber composite ground wire having small outer diameter, light weight, high tensile load, and low electrical resistance.

Other objects and features of this disclosure will become more apparent from the following detailed description, the drawings, and the claims.

According to one aspect, there is provided an optical fiber unit for optical fiber composite ground wire including at least one optical fiber; an outer tube into which the at least one optical fiber is inserted; and a composite material filled in the outer tube to protect the at least one optical fiber, wherein the composite material includes fiber and resin.

According to another aspect, there is provided an optical fiber unit for optical fiber composite ground wire including at least one optical fiber; an inner tube into which the at least one optical fiber is inserted; a filler filled in the inner tube to protect the at least one optical fiber; an outer tube into which the inner tube is inserted; and a composite material filled in the outer tube to protect the at least one optical fiber and the inner tube, wherein the composite material includes fiber and resin.

According to one embodiment of this disclosure, one or more inner tubes into which the at least one optical fiber is inserted may be included.

According to one embodiment of this disclosure, the inner tube may be composed of a curable resin.

According to one embodiment of this disclosure, the filler may be a jelly compound.

According to one embodiment of this disclosure, the outer tube may be composed of a curable resin.

According to one embodiment of this disclosure, the fiber may be at least one of carbon fiber, glass fiber, and alumina.

According to still another aspect, there is provided an optical fiber composite ground wire including an optical fiber unit of this disclosure.

According to one embodiment of this disclosure, the optical fiber composite ground wire may include an aluminum wire layer, which is twisted and disposed on the outer surface of the optical fiber unit.

According to one embodiment of this disclosure, the aluminum wire layer may be formed by alone or a mixture of an aluminum-clad steel wire and an aluminum wire.

According to one embodiment of this disclosure, the cross-section of the aluminum wire and aluminum-clad steel wire may have a circular or trapezoidal shape.

According to one embodiment of this disclosure, the aluminum wire layer may be formed of two or more layers.

According to one embodiment of this disclosure, each layer of the aluminum wire layers maybe twisted in opposite directions.

According to one embodiment of this disclosure, an optical fiber composite ground wire may be provided by placing an optical fiber in a high-strength composite material composed of fiber and resin to have simple structure, to relief the impact applied to the optical fiber, and further not to require a peripheral tension wire.

According to one embodiment of this disclosure, an optical fiber composite ground wire with small outer diameter, light weight, high tensile load and low electrical resistance may be provided since the high-strength composite material and the aluminum conductor are stranded.

Therefore, it is possible to increase the reliability of the cable because the deformation of the optical fiber caused with its own weight and tension becomes small compared to the conventional optical fiber composite ground wire.

It is also possible to reduce the electrical resistance of the cable because the high-strength composite material facilitates the use of aluminum wires.

It is also possible to facilitate the manufacture of the multi-core optical fiber composite ground wire because the number of cores of the optical fibers may be increased by the high tensile load of the optical core using the composite material.

According to one embodiment of this disclosure, since the tube and the optical fiber unit are manufactured in close contact with each other, moisture penetration and ultraviolet rays are completely blocked and resistance to corrosion is increased, thereby ensuring excellent corrosion resistance.

According to one embodiment of this disclosure, it is possible to reduce the electrical resistance by arranging the aluminum wire on the outside in a circular or trapezoidal shape. Since the current capacity can be increased with these characteristics, it can be used as optical fiber composite ground wires and power lines.

DETAILED DESCRIPTION

Figure 1A:
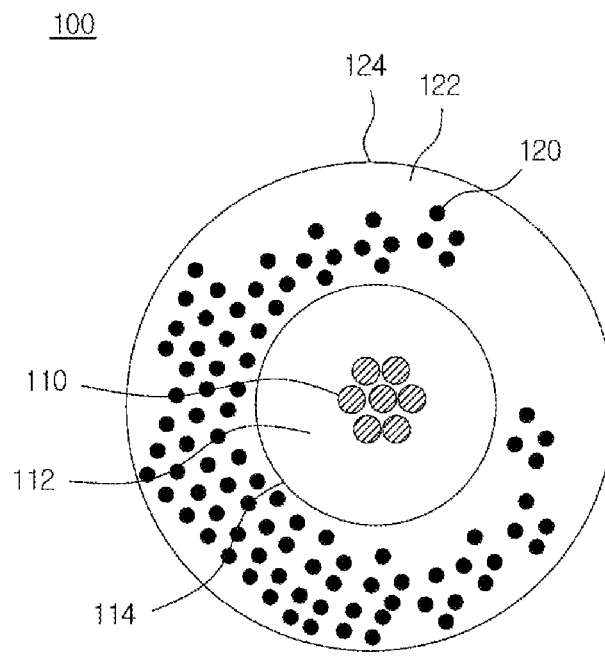
FIG. 1A to FIG. 1C are cross-sectional diagrams illustrating an optical fiber unit for an optical fiber composite ground wire manufactured using a composite material according to an embodiment.

The above and other objects, features and advantages of the present disclosure will become more apparent to those of ordinary skill in the art by describing in detail exemplary embodiments thereof with reference to the accompanying drawings.

Throughout the specification and claims, terms or words are not to be interpreted in conventional and dictionary meaning, but to be interpreted as meaning and concept consistent with the technical idea of this disclosure based on the principle that the inventor may appropriately define the concept of those terms or words in order to describe his own invention in the best way.

The terms used in the description are intended to describe certain embodiments only, and shall by no means restrict the present disclosure. Unless clearly used otherwise, expressions in the singular number include a plural meaning.

In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Also, throughout the specification, the term "on" is intended to mean that a component can be positioned at an upper portion or a lower portion of the mentioned part and does not necessarily refer to an upper position with respect to the direction of gravity.

While the present disclosure has been described with reference to particular embodiments, it is to be appreciated that various changes and modifications may be made by those of ordinary skill in the art without departing from the spirit and scope of the present disclosure, as defined by the appended claims and their equivalents. Throughout the description of the present disclosure, when describing a certain technology is determined to evade the point of the present disclosure, the pertinent detailed description will be omitted.

An optical fiber unit for an optical fiber composite ground wire of this disclosure includes: at least one optical fiber; an outer tube into which the at least one optical fiber is inserted; and a composite material that is filled in the outer tube to protect the at least one optical fiber, wherein the composite material includes a fiber and a resin.

The optical fiber may be composed of one core or multiple cores as a core wire. In addition, the optical fiber may be a coated optical fiber. The optical fiber may be collected and protected in the composite material.

The composite material may serve to protect the at least one optical fiber as a composite of fiber and resin.

The fiber may be at least one of carbon fiber, glass fiber, and alumina, but may not be limited thereto.

The carbon fiber may have a diameter of 3 to 15 µm, but may not be limited thereto. The carbon fiber with a diameter of less than 3 µm may be too small to handle and be expensive. On the other hands, the carbon fiber with a diameter of greater than 15 µm may be hard and brittle.

The glass fiber may have a diameter of 5 to 20 µm, but may not be limited thereto.

The outer tube may be made of thermosetting resin, photo-curable resin, stainless steel, or aluminum, but may not be limited thereto. A thermosetting polymer resin may be used herein. That is, the resin may be a high-temperature epoxy resin based on a similar resin material such as poly ether amide resin (PEAR), bismaleimide, polyimide and the like. The outer tube may be also composed of a metal such as aluminum. When the outer tube is made of thermosetting resin, it may be suitable in terms of weight reduction, cost reduction, and simplification of the manufacturing process of the optical fiber unit.

Figure 1B:
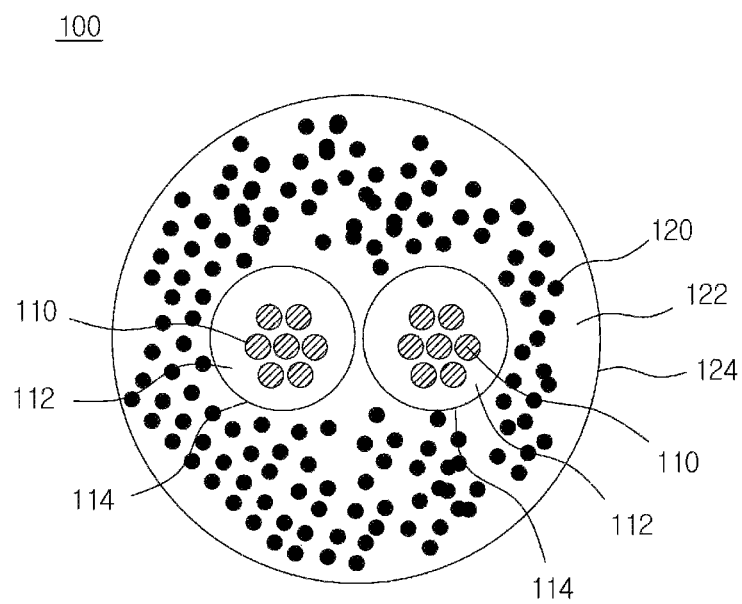
Figure 1C:
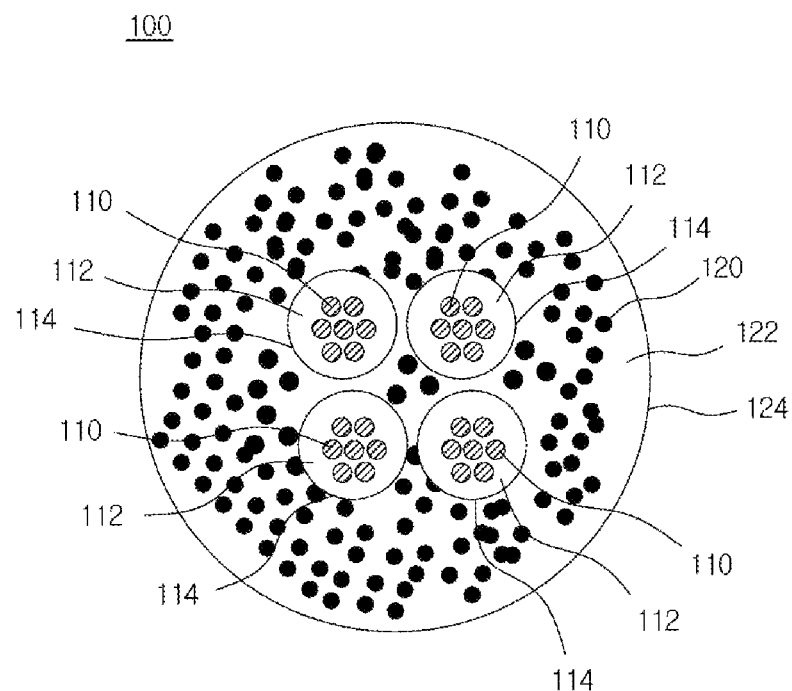

FIG. 1A to FIG. 1C are cross-sectional diagrams illustrating an optical fiber unit manufactured using a composite material according to an embodiment.

Referring to FIG. 1A, an optical fiber unit 100 for an optical fiber composite ground wire includes at least one optical fiber 110; an inner tube 114 into which the at least one optical fiber 110 is inserted; a filler 112 that is filled in the inner tube 114 to protect the at least one optical fiber 110; an outer tube 124 into which the inner tube 114 is inserted;

and a composite material that is filled in the outer tube 124 to protect the at least one optical fiber 110 and the inner tube 114, wherein the composite material includes fiber 120 and resin 122.

The optical fiber 110 may be composed of one core or multiple cores as a core wire. In addition, the optical fiber 110 may be a coated optical fiber. The optical fiber 110 may be collected and protected in the composite material.

The inner tube 114 may be made of thermosetting resin, photo-curable resin, stainless steel, or aluminum, but may not be limited thereto. When the inner tube 114 is made of thermosetting resin, it may be suitable in terms of weight reduction, cost reduction, and simplification of the manufacturing process of the optical fiber unit.

As shown in FIG. 1B and FIG. 1C, the optical fiber unit 100 may include one or more inner tubes 114 into which the at least one optical fiber 110 is inserted.

As long as the filler 112 can protect the optical fiber 110, there may be no particular limitation.

The filler 112 may be a resin-based jelly compound and may be suitable for preventing moisture from penetrating into the composite material.

The composite material may serve to protect the at least one optical fiber and may be a composite of the fiber 120 and the resin 122. The fiber 120 may be at least one of carbon fiber, glass fiber, and alumina, but may not be limited thereto. The carbon fiber may have a diameter of 3 to 15 µm, but may not be limited thereto. The glass fiber may have a diameter of 5 to 20 µm, but may not be limited thereto.

The outer tube 124 may be made of thermosetting resin, photo-curable resin, stainless steel, or aluminum, but may not be limited thereto. When the outer tube 124 is made of thermosetting resin, it may be suitable in terms of weight reduction, cost reduction, and simplification of the manufacturing process of the optical fiber unit.

Hereinafter, a method of manufacturing an optical fiber unit of this disclosure will be described.

After the optical fiber 110 is inserted into the inner tube 114, a jelly compound, which is the filler 112, may be filled.

The fiber 120 such as carbon fiber and glass fiber may be continuously supplied to the outer layer of the inner tube 114 through a pulley with a predetermined interval.

Thermosetting resin or the like may be then supplied to the outer layer in a predetermined thickness and pultruded to form the outer tube 124 including the composite material.

The optical fiber composite ground wire of this disclosure includes the optical fiber unit of this disclosure.

Figure 2A:
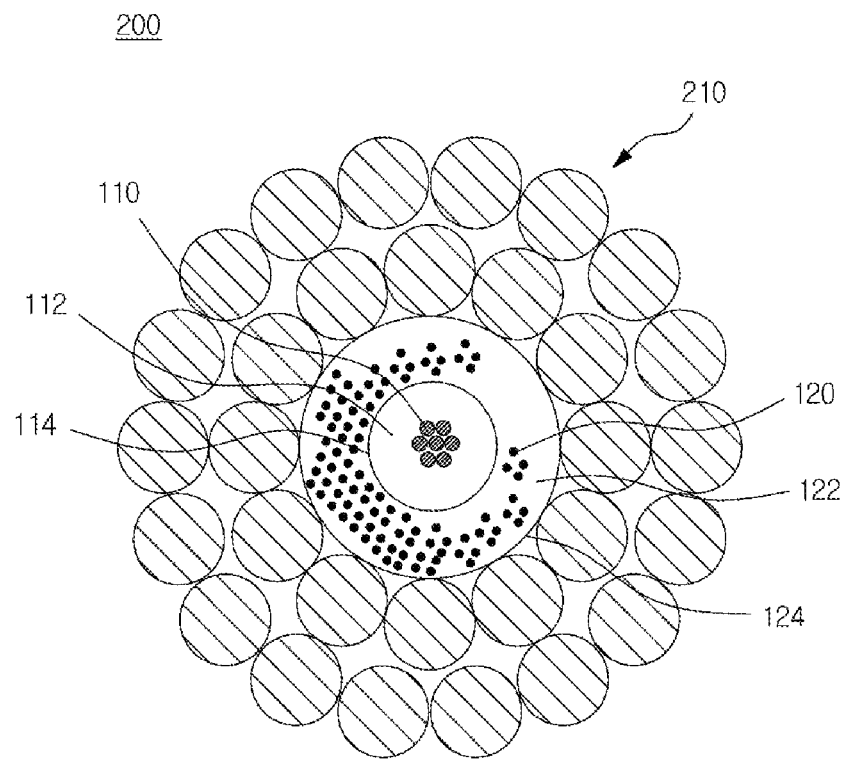
FIG. 2A and FIG. 2B are cross-sectional diagrams schematically illustrating an optical fiber composite ground wire including an aluminum wire according to another embodiment.
Figure 2B:
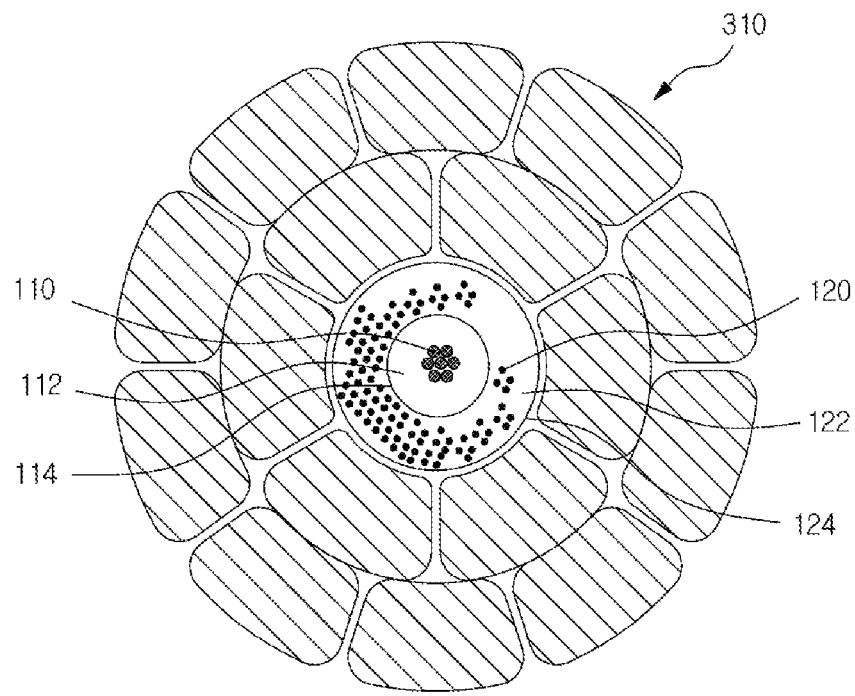
Figure 3A:
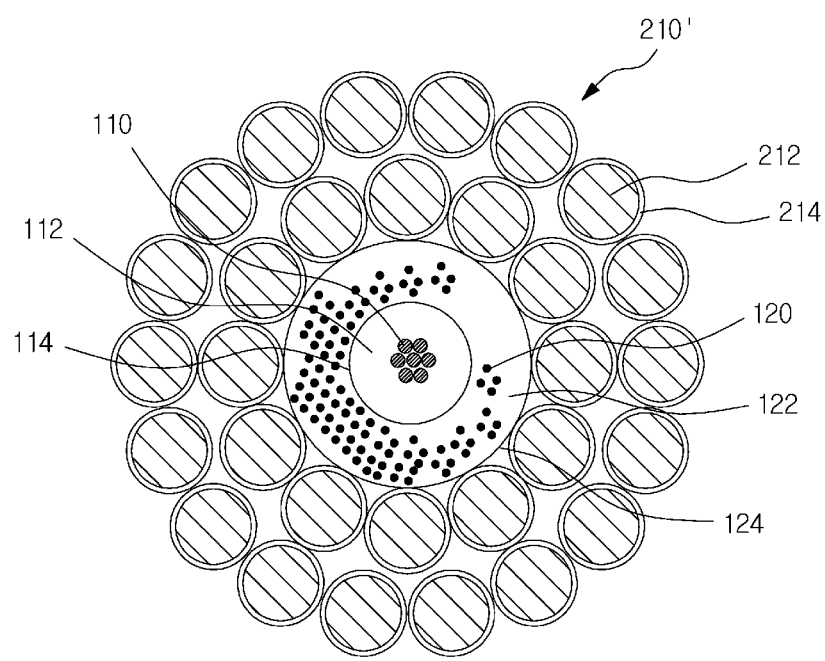
FIG. 3A and FIG. 3B are cross-sectional diagrams schematically illustrating an optical fiber composite ground wire including an aluminum-clad steel wire according to another embodiment.
Figure 3B:
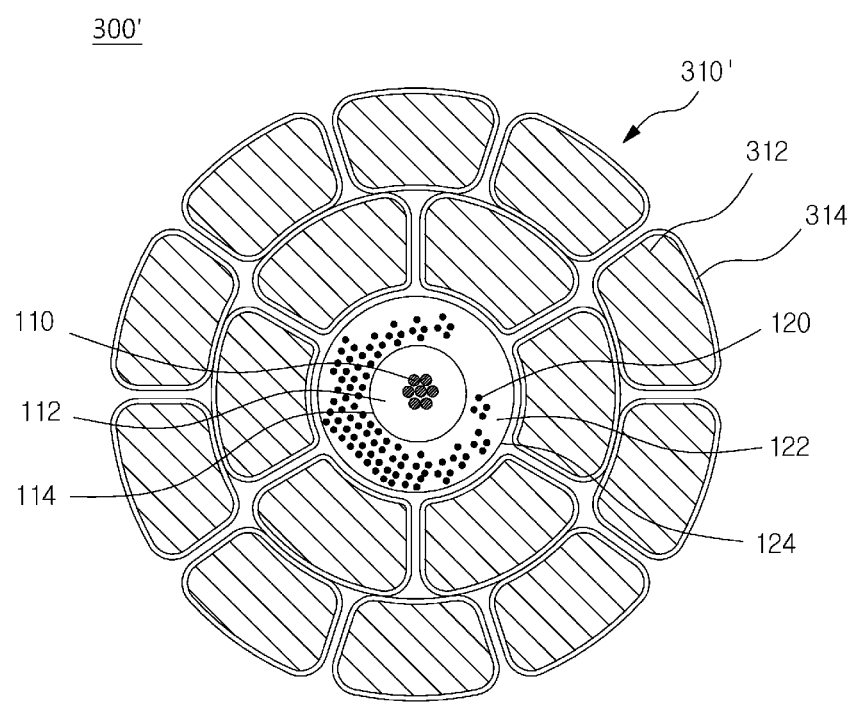

FIG. 2A and FIG. 2B are cross-sectional diagrams schematically illustrating an optical fiber composite ground wire 200, 300 including an aluminum wire 210, 310 according to another embodiment. FIG. 3A and FIG. 3B cross-sectional diagrams schematically illustrating an optical fiber composite ground wire 200', 300' including an aluminum-clad steel wire 210', 310' according to another embodiment.

Referring to FIG. 2A to FIG. 3B, the optical fiber composite ground wire 200, 200', 300, 300' may include an aluminum wire layer, which is twisted and disposed on the outer surface of the optical fiber unit.

The aluminum wire layer may be formed by alone or a mixture of the aluminum wire 210, 310 and the aluminum-clad steel wire 210', 310'. Mechanical and electrical properties, such as tensile load or electrical resistance, may be adjusted by selecting and combining the aluminum wire 210, 310 and the aluminum-clad steel wire 210', 310'.

The cross section of the aluminum wire 210, 310 and the aluminum-clad steel wire 210', 310' may have a circular shape (FIG. 2A and FIG. 3A) or a trapezoidal shape (FIG. 2B and FIG. 3B). The aluminum wire 210, 310 and the aluminum-clad steel wire 210', 310' may be twisted and stranded at a predetermined pitch. The aluminum wire 210, 310 and the aluminum-clad steel wire 210', 310' may be provided on the outer periphery of the optical fiber unit in order to provide the mechanical and electrical properties of the optical fiber composite ground wire 200, 200', 300, 300'.

The aluminum wire layer may be formed of two or more layers. In this case, each layer of the aluminum wire layer may be formed by twisting them in opposite directions.

The optical fiber composite ground wires 200, 200', 300, 300' of this disclosure having the above configuration may protect the set of optical fibers 110 and serve as a tension line.

Hereinafter, a method of manufacturing an optical fiber composite ground wire of this disclosure will be described.

The optical fiber unit manufactured above may be disposed in the center to form a central unit, and an aluminum wire layer may be formed by twisting an aluminum wire and/or an aluminum-clad steel wire at a predetermined pitch.

Here, the aluminum wire or the aluminum-clad steel wire may be combined in one or two or more layers. The aluminum wire or the aluminum-clad steel wire may be adjusted in consideration of mechanical and electrical properties such as desired tensile load or electrical resistance.

As described above, the optical fiber unit of this disclosure may protect the central optical fiber from external corrosion and impact by using a composite material of fiber and resin and serve as a center line for supporting the load of the cable. Accordingly, it is possible to provide the optical fiber composite ground wire that does not require a tensile line unlike the prior art by utilizing the high-strength composite material of this disclosure.

The present invention will be described in more detail through the following examples, but the scope of the present invention is not limited to the following examples.

EXAMPLES

Manufacture of Optical Fiber Composite Ground Wire

An optical fiber and a jelly compound as a filler were collected and filled in an inner tube as a protective layer.

Carbon fiber and resin were mixed and applied to an outer layer of the inner tube, and the surface portion was pultruded and cured with a thermosetting resin to produce a 4.5 mm optical fiber unit.

The optical fiber unit manufactured as described above was placed in the center and a 4.5 mm equivalent diameter circular and trapezoidal aluminum wire was twisted at a predetermined pitch to provide an optical fiber composite ground wire of Example 1 and Example 2, respectively.

Table 1 shows comparison of the characteristics of the conventional optical fiber composite ground wire (produced by Gaon cable Co. Ltd.) as Comparative Example with Examples 1 and 2 of the optical fiber composite fabrication wire manufactured according to this disclosure.

TABLE 1

| Category | Unit | Comparative Example (24 cores) | Example 1 (24 cores) | Example 2 (24 cores) |
| --- | --- | --- | --- | --- |
| Type | | Round | Round | TW |
| Cross-sectional area | $mm_2$ | 58 | 95 | 95 |

TABLE 1-continued

| Category | Unit | Comparative Example (24 cores) | Example 1 (24 cores) | Example 2 (24 cores) |
|---|---|---|---|---|
| Construction | No/mm | 1/3.5 SSLT + 6/3.5 AS | 1/4.5 CF + 6/4.5 Al | 1/4.5 CF + 6/4.5 Al |
| Outer Diameter | mm | 10.5 | 13.5 | 10.0 |
| Weight | Kg/km | 410 | 350 | 350 |
| Minimum tensile load | kgf | 7,000 | 7,200 | 7,200 |
| Electrical resistance | Ω/km | 1.5268 | 0.3028 | 0.3028 |

TW: Trapezodial Wire,
SSLT: Stainless Steel Loose Tube,
AS: aluminum-clad steel wire,
CF: composite material-included optical fiber unit,
Al: aluminum wire As shown in Table 1, when comparing based on the same minimum tensile load, the cross-sectional areas of the optical fiber composite ground wires of Examples 1 and 2 manufactured according to this disclosure are about 95 mm$^2$, which was increased by about 64% compared to 58 mm$^2$ of Comparative Example.

In addition, the weights of the optical fiber composite ground wires of Examples 1 and 2 were 350 kg/km, which was decreased by about 15% compared to 410 kg/km of Comparative Example. It is thus possible to minimize damage associated with external environment such as wind pressure during use as it is constructed by reducing the weight as described above. It is also possible to prevent damage to the optical fiber due to sagging of the optical fiber composite ground wire during use.

In particular, the optical fiber composite ground wires of Examples 1 and 2 exhibited excellent performance in electrical properties such as electrical resistance. The electrical resistances of the optical fiber composite ground wires of Examples 1 and 2 manufactured according to this disclosure were 0.3028 Ω/km, which was reduced by about 80% to a level of about 20% compared to the electrical resistance of 1.528 Ω/km of Comparative Example. This can reduce the electrical resistance by arranging the aluminum wire in a circular or trapezoidal shape under the same minimum tensile load. Such characteristics can increase the current capacity, so that it can be used as optical fiber composite ground wires and power lines.

While the foregoing describes certain preferred embodiments of the present disclosure, those of ordinary skill in the art would understand that the present disclosure can be modified and altered in various ways without departing from the spirit of the present disclosure disclosed in the claims by supplementing, altering, omitting, or adding one or more elements, and it should be noted that such modifications and alterations are encompassed within the scope of rights of the present disclosure.

DESCRIPTION OF REFERENCE NUMERALS

100: optical fiber unit
110: optical fiber
112: jelly compound
114: inner tube
120: fiber
122: resin
124: outer tube
200, 200', 300, 300': optical fiber composite ground wire
210, 310: aluminum wire
210', 310': aluminum-clad steel wire
212, 312: steel wire
214, 314: sheath

What is claimed is:

1. An optical fiber unit for optical fiber composite ground wire comprising:
   at least one optical fiber;
   an outer tube into which the at least one optical fiber is inserted; and
   a composite material filled in the outer tube to protect the at least one optical fiber, wherein the composite material comprises fiber and resin,
   wherein the fiber is at least one of carbon fiber, and alumina, and
   wherein the composite material is formed into a mixed composite of the fiber and the resin.

2. An optical fiber unit for optical fiber composite ground wire comprising:
   at least one optical fiber;
   an inner tube into which the at least one optical fiber is inserted;
   a filler filled in the inner tube to protect the at least one optical fiber;
   an outer tube into which the inner tube is inserted; and
   a composite material filled in the outer tube to protect the at least one optical fiber and the inner tube,
   wherein the composite material comprises fiber and resin.

3. The optical fiber unit of claim 2, wherein the optical fiber unit comprises one or more of the inner tubes into which the at least one optical fiber is inserted.

4. The optical fiber unit of claim 2, wherein the inner tube is composed of a curable resin.

5. The optical fiber unit of claim 2, wherein the filler is a jelly compound.

6. The optical fiber unit of claim 2, wherein the outer tube is composed of a curable resin.

7. The optical fiber unit of claim 2, wherein the fiber is at least one of carbon fiber, glass fiber, and alumina.

8. An optical fiber composite ground wire comprising an optical fiber unit of claim 2.

9. The optical fiber composite ground wire of claim 8, comprising an aluminum wire layer, which is twisted and disposed on the outer surface of the optical fiber unit.

10. The optical fiber composite ground wire of claim 9, wherein the aluminum wire layer is formed by alone or a mixture of an aluminum-clad steel wire and an aluminum wire.

11. The optical fiber composite ground wire of claim 10, wherein the cross-section of the aluminum-clad steel wire and aluminum wire has a circular or trapezoidal shape.

12. The optical fiber composite ground wire of claim 9, wherein the aluminum wire layer is formed of two or more layers.

13. The optical fiber composite ground wire of claim 12, wherein each layer of the aluminum wire layers is twisted in opposite directions.

\* \* \* \* \*